J. H. GRAVELL.
WELDING MACHINE.
APPLICATION FILED OCT. 31, 1912.
1,067,478.
Patented July 15, 1913.
2 SHEETS—SHEET 1.
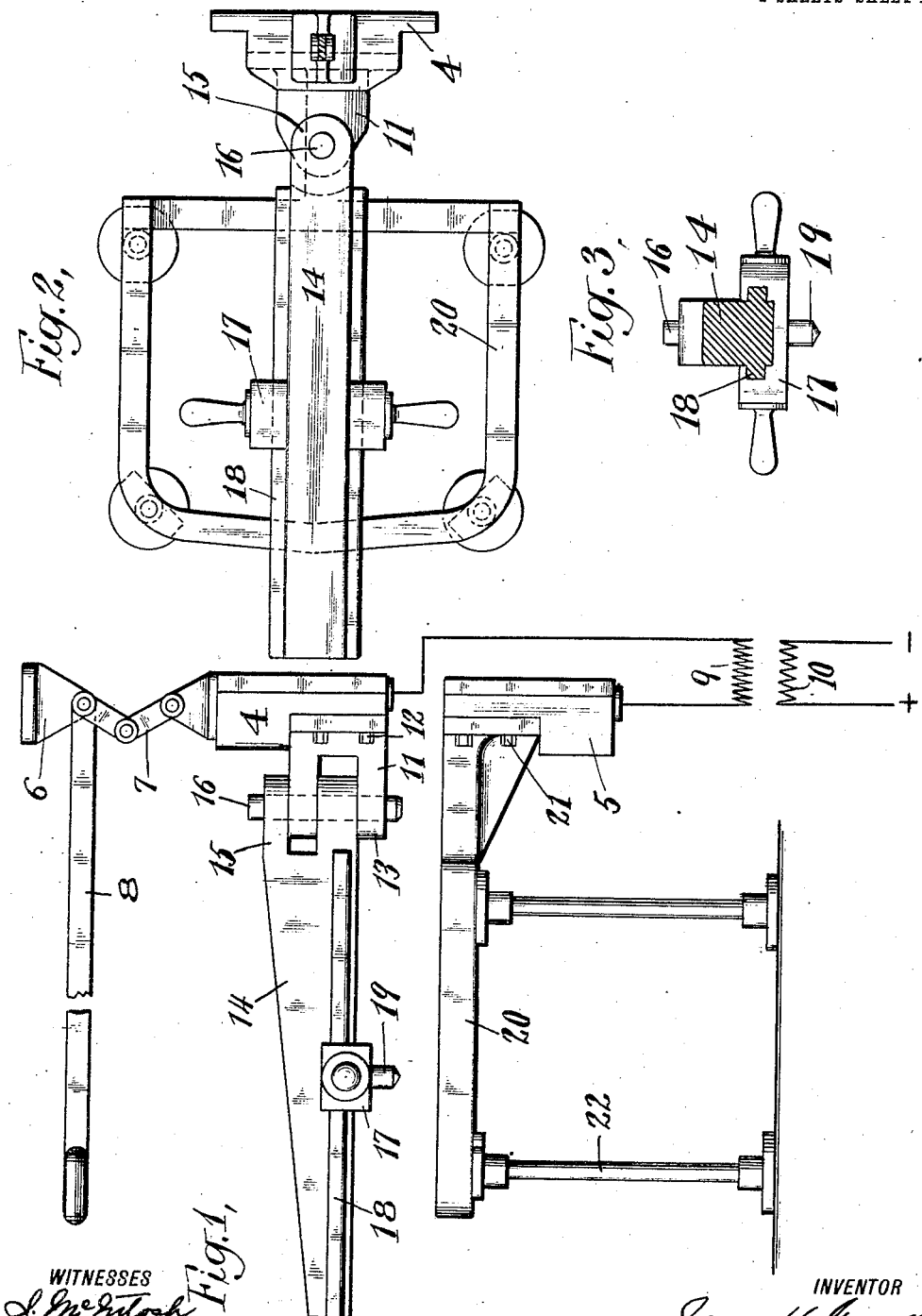

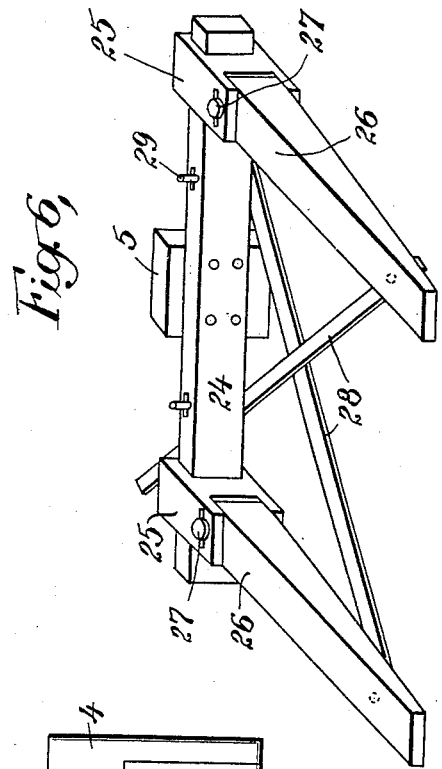
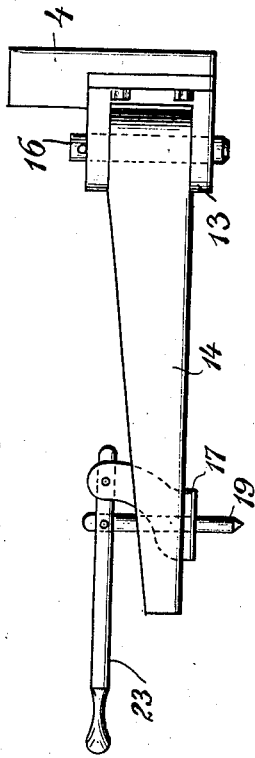
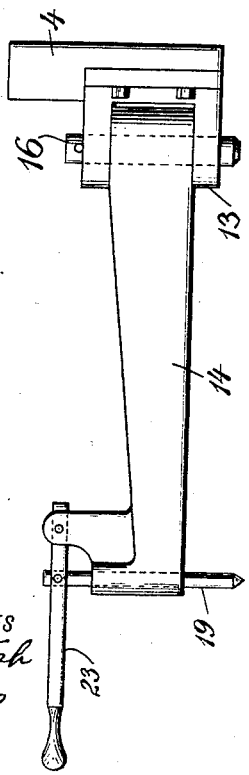

UNITED STATES PATENT OFFICE.

JAMES H. GRAVELL, OF PHILADELPHIA, PENNSYLVANIA, ASSIGNOR TO HALE AND KILBURN COMPANY, OF PHILADELPHIA, PENNSYLVANIA, A CORPORATION OF DELAWARE.

WELDING-MACHINE.

1,067,478.   Specification of Letters Patent.   Patented July 15, 1913.

Application filed October 31, 1912. Serial No. 728,797.

*To all whom it may concern:*

Be it known that I, JAMES H. GRAVELL, a citizen of the United States, residing at Philadelphia, in the county of Philadelphia and State of Pennsylvania, have invented certain new and useful Improvements in Welding-Machines, of which the following is a specification.

This invention relates to welding machines and is directed to the provision of certain improvements in machines of this character, whereby the range of utility of such a machine is increased and whereby more rapid and accurate work may be done on the machine.

The invention is of greatest utility in connection with machines for effecting welds in metallic pieces of substantial size. When welding together such large pieces, it is the common practice to move the pieces to be welded together between the terminals of a welding machine, the welds being made at spaced points along their length. In some cases, however, the employment of this method is difficult or impossible because of the size and shape of the parts to be welded. An instance of this is in the manufacture of automobile bodies from metallic pieces. The present invention is particularly adapted for welding together the parts of automobile bodies and other devices whose parts are of substantial size and bulk.

The invention involves the provision of an arm pivotally mounted upon and extending laterally from one terminal of a welding machine and, in combination therewith, a table or work-supporting member secured to and extending laterally from the other terminal of the machine parallel to the pivoted arm. In this way, with a single adjustment of the parts to be welded upon the work-supporting member, welds can be made at any point over the entire area of the work-supporting member and within the range of movement of the pivoted arm. The arm may be provided with a tool-holder which is mounted thereon so as to slide back and forth upon the arm, or if desired, a separate tool may be employed which may be held between the work and the pivoted arm in electrical connection with both of them.

The preferred embodiment of the invention is illustrated in the accompanying drawings in which—

Figure 1 is an elevation of the machine, certain of the parts being shown diagrammatically, Fig. 2 is a top view of the terminals of the machine, Fig. 3 is a section through the pivoted arm showing the tool-holder mounted thereon, and Figs. 4, 5 and 6 show modifications hereinafter described.

Referring to these drawings, the invention is illustrated as applied to a welding machine having the terminals 4 and 5 thereof arranged one above the other and the upper one movable toward and away from the lower one. The machine may be of the usual or any suitable type, the particular construction of the machine itself forming no part of the present invention. The upper terminal 4 is provided with any suitable means for raising and lowering it so as to force the welding tool into engagement with the work and close the electric circuit through the tool and work. In the present instance the upper terminal 4 is shown as connected to a support 6 by a toggle 7, which may be operated by a suitable handle 8 so as to raise and lower the terminal 4. The two terminals are connected to opposite sides of the secondary 9 of a transformer whose primary is shown at 10.

The upper terminal 4 has a member 11 rigidly secured thereto by means of bolts 12. This member is preferably a casting of copper. Member 11 is formed to provide two laterally extending hinge-members 13, and it forms the support for a pivoted arm 14 which extends horizontally from the terminal 4. This arm 14 is also provided with hinge-members, as shown at 15, and a pivot-pin 16 extends through openings in all of the hinge-members 13 and 15 so as to effect the pivotal mounting of the arm 14 on the terminal 4. The arm 14 is preferably provided with a tool-holder 17 which is movable lengthwise of the arm 14 as desired. For this purpose the arm 14 may have ways 18 formed on the sides thereof which enter grooves in the tool-holder 17, as shown in Fig. 3. Preferably the tool-holder 17 is provided with means for securing a suitable welding tool 19 therein.

The lower terminal 5 has a table or work-supporting member 20 mounted thereon. In Figs. 1 and 2, this table 20 is shown as a single casting of copper of substantial length and breadth and secured to terminal 5 by bolts 21. The work-supporting member may be supported from the floor by means of posts 22.

To facilitate the manufacture of welded articles, the body portion of the table 20 is preferably of a shape corresponding to the shape of the article to be welded. In the present instance a table 20 is shown of a shape which may be employed in welding together the parts of automobile bodies. In any case, the body portion of the table 20 will be of such length and breadth as to support the parts to be welded over such an area that welds can be made with the arm 14 in various positions of its angular movement and with the tool-holder 17 in various positions along the length of arm 14.

When using the machine constructed as described for welding together the parts of automobile bodies, these parts are assembled upon the table 20 in the proper relative positions. The parts may include the body sheet, the floor, the skeleton frame and the molding for an automobile body, all of which parts have to be welded together at a plurality of points around the edge of the floor. When the parts have been thus assembled, they are supported at all the points where the welds are to be made by the table 20. The arm 14 may then be so swung on its pivot and the tool-holder 17 so moved upon the ways 18 that the tool in the holder 17 will be directly over the point where a weld is to be made. The upper terminal 4 is then moved downwardly so as to carry the tool into contact with the parts on the table 20 and the circuit is then closed so as to effect the weld. After the weld has been made, the tool may be moved to the next welding point by moving the tool-holder 17 and swinging the arm 14 as may be necessary.

By having the table casting or work-supporting member 20 of the proper shape, the work can be gaged at the same time that the welds are made, thus producing an accurate and uniform product and decreasing the time required for the completion of the operation of assembling the parts and securing them together. The time required for the completion of the work is also materially reduced by the facility with which the necessary changes of the parts can be made after one weld has been effected and in preparing for the next weld. For this purpose the work does not have to be shifted at all and it is only necessary to move the arm 14 about its pivot and slide the holder 17 upon the ways 18.

The construction above described may be modified while retaining the same method of operation and the same advantages. Thus the provision of a movable terminal upon the welding machine is not essential, as the two terminals of the machine may be stationarily mounted and provision may be made for movement of the tool relatively to the arm by which it is sustained. Such a construction is illustrated in Fig. 4, wherein the terminal 4 is stationary. The tool 19 is movable vertically in an opening provided for its reception in arm 14 and is actuated by a handle 23 pivoted on arm 14.

If desired, the construction shown in Fig. 4 may be modified by the provision of means permitting the movement of the tool lengthwise of the arm. This is shown in Fig. 5, wherein the tool 19 is carried by a holder 17 adapted to slide lengthwise of arm 14 in a slot provided in the arm.

A further modification is shown in Fig. 6 by means of which the range of utility of the machine is increased. This modification resides in the provision of certain movable parts in the work-supporting member secured to the lower terminal, which parts may be adjusted relatively in a plane parallel to the plane of movement of the swinging arm 14. In Fig. 6 the lower terminal 5 has a bar 24 secured thereto, upon which two hinge-members 25 are secured. An arm 26 is pivoted to each hinge-member 25 by means of a vertical hinge-pin 27, the two arms 26 having their upper surfaces in the same plane. A strip 28 connects the free end of each arm 26 with the bar 24, the strip being pivoted to the arm. Pins 29 are provided by means of which the strips 28 may be secured to bar 24 in any desired position. By this construction the arms 26 may be moved relatively to such positions as may be required by the particular work being done and then held in those positions by the strips 28 and pins 29. While the construction shown in Fig. 6 is useful in making a wide variety of devices, it is of special utility when welding together the parts of a sheet-metal structure which is open along one edge only and in which the open edge is shorter than the opposite edge.

Having described my invention, what I claim as new therein and desire to secure by Letters Patent of the United States is:

1. In a welding machine, the combination of two terminals, one of which is movable toward and away from the other, an arm pivotally mounted on one of the terminals and extending laterally therefrom, a tool mounted on said arm for movement lengthwise of the arm, and a work-supporting member secured to the other terminal and extending laterally therefrom under said arm, substantially as set forth.

2. In a welding machine, the combination of two supports, an arm extending laterally from one of said supports and pivotally mounted thereon so as to swing about an axis, and a work-supporting member secured to the other support and presenting an enlarged area parallel to the plane of movement of said arm for co-action with a tool electrically connected to the arm at any point along the length of the arm when the arm is in any position of its pivotal movement, substantially as set forth.

3. In a welding machine, the combination of two terminals, one of which is movable toward and away from the other, an arm pivotally mounted on one of the terminals, electrically connected thereto and extending laterally therefrom, and a work-supporting member secured to the other terminal and extending laterally therefrom under said pivoted arm for co-action with a tool electrically connected to said arm, substantially as set forth.

4. In a welding machine, the combination of two terminals, a member secured to one of said terminals and having hinge-members formed thereon, an arm having hinge-members formed in one end thereof, a hinge-pin extending through said hinge-members to pivotally support the arm on said terminal, a tool-holding member mounted on said arm to slide back and forth thereon, and a work-supporting member secured to the other of said terminals, electrically connected thereto and presenting an enlarged area parallel to the plane of movement of said arm for co-action with a tool held by said tool-holding member when said tool-holding member is in any position lengthwise of said arm and when the arm is in any position of its pivotal movement, substantially as set forth.

5. In a welding machine, the combination of two supports, an arm pivotally mounted on one of said supports and extending laterally therefrom, a tool mounted on said arm and movable lengthwise of the arm, and a work-supporting member secured to the other support and presenting an enlarged area parallel to the plane of movement of said arm for co-action with said tool when the tool is in any position lengthwise of the arm and when the arm is in any position of its pivotal movement, substantially as set forth.

6. In a welding machine, the combination of two terminals, an arm extending laterally from one of said terminals and pivotally mounted thereon so as to swing about an axis, and a work-supporting member secured to the other terminal and extending laterally therefrom for co-action with a tool electrically connected to said arm, certain portions of said member being adjustable relatively in a plane parallel to the plane of movement of said pivoted arm, substantially as set forth.

7. In a welding machine, the combination of two terminals, one of which is movable toward and away from the other, an arm pivotally mounted on one of the terminals and extending laterally therefrom, a tool mounted on said arm for movement lengthwise of the arm, and a work-supporting member secured to the other terminal and extending laterally therefrom under said arm, certain portions of said member being adjustable relatively in a plane parallel to the plane of movement of said pivoted arm, substantially as set forth.

8. In a welding machine, the combination of two terminals, a member secured to one of said terminals and having hinge-members formed thereon, an arm having hinge-members formed in one end thereof, a hinge-pin extending through said hinge-members to pivotally support the arm on said terminal, a tool-holding member mounted on said arm to slide back and forth thereon, and a work-supporting member secured to the other of said terminals, electrically connected thereto and extending laterally therefrom parallel to said arm, certain portions of said member being adjustable relatively in a plane parallel to the plane of movement of said pivoted arm, substantially as set forth.

This specification signed and witnessed this 29th day of October, 1912.

JAMES H. GRAVELL.

Witnesses:
JOHN B. KILBURN,
WILLIAM J. EARNSHAW.